(12) United States Patent
Ye et al.

(10) Patent No.: US 11,718,517 B2
(45) Date of Patent: Aug. 8, 2023

(54) EFFICIENT DISTRIBUTOR

(71) Applicant: Ningbo Major Draft Beer Equipment Co., Ltd., Ningbo (CN)

(72) Inventors: Xiaoyang Ye, Ningbo (CN); Bangcai Luo, Ningbo (CN)

(73) Assignee: Ningbo Major Draft Beer Equipment Co., Ltd., Ningbo (CN)

( * ) Notice: Subject to any disclaimer, the term of this patent is extended or adjusted under 35 U.S.C. 154(b) by 0 days.

(21) Appl. No.: 17/514,252

(22) Filed: Oct. 29, 2021

(65) Prior Publication Data

US 2022/0289553 A1 Sep. 15, 2022

(30) Foreign Application Priority Data

Mar. 10, 2021 (CN) .......................... 202110261759.5
Mar. 10, 2021 (CN) ......................... 202120506754.X (51) Int. Cl.
*B67D 1/08* (2006.01)
*B67D 3/04* (2006.01)
*F16K 31/60* (2006.01)

(52) U.S. Cl.
CPC ............ *B67D 3/045* (2013.01); *F16K 31/602* (2013.01)

(58) Field of Classification Search
CPC .... B67D 3/045; B67D 1/0832; B67D 1/0848; B67D 1/0839; B67D 1/0831; B67D 1/0838; B67D 1/0829; F16K 31/602
USPC ........................... 222/399, 400.7, 400.8, 509
See application file for complete search history.

(56) References Cited

U.S. PATENT DOCUMENTS

| | | | | |
|---|---|---|---|---|
| 4,450,853 A * | 5/1984 | Dessenoix | ........... | B67D 1/0832 137/212 |
| 4,458,719 A * | 7/1984 | Strybel | ................. | F16L 37/127 251/149.6 |
| 4,641,859 A * | 2/1987 | Walters | ............... | F16L 37/0848 285/308 |
| 4,728,010 A * | 3/1988 | Johnston | .............. | B67D 1/0832 137/212 |
| 4,736,926 A * | 4/1988 | Fallon | .................. | B67D 1/0832 285/317 |
| 5,044,279 A * | 9/1991 | Fukushima | ............... | F17C 9/00 102/293 |
| 5,636,656 A * | 6/1997 | Hubbard | .............. | B67D 1/0848 137/212 |
| 5,690,136 A * | 11/1997 | Celli | .................... | B67D 1/0839 137/212 |
| 6,315,172 B1 * | 11/2001 | Till | ...................... | B67D 1/0832 222/509 |

(Continued)

*Primary Examiner* — Charles P. Cheyney
(74) *Attorney, Agent, or Firm* — Wood, Phillips, Katz, Clark & Mortimer (57) ABSTRACT

The disclosure herein discloses an efficient distributor, which includes a distributor shell, an operating member, a locking member, and a control member connected to the operating member. The operating member includes a locking matching member with a locking boss protruding therefrom. The locking boss includes a first locking matching surface and a second locking matching surface. The locking member includes a locking block capable of moving to or away from the locking matching member, and a first reset member. According to the disclosure herein, the locking boss and the locking block are automatically unlocked when a state of the operating member is switched and automatically locked after the state is switched, so the efficient distributor is convenient.

10 Claims, 6 Drawing Sheets

(56) References Cited

U.S. PATENT DOCUMENTS

| | | | | |
|---|---|---|---|---|
| 6,367,667 B1* | 4/2002 | Ipsen | ................... | B67D 1/0832 |
| | | | | 222/509 |
| 6,598,768 B2* | 7/2003 | Celli | ................... | B67D 1/0839 |
| | | | | 222/509 |
| 11,192,771 B2* | 12/2021 | Wolter | ................. | B67D 1/0832 |
| 2014/0124543 A1* | 5/2014 | Dahl | ................... | B67D 1/0832 |
| | | | | 222/400.7 |

* cited by examiner

EFFICIENT DISTRIBUTOR

TECHNICAL FIELD

The disclosure herein relates to the field of kegs for keeping beer fresh, and particularly to an efficient distributor.

BACKGROUND

A distributor is matched with a keg spear of a beer keg to control an open/closed state of the keg spear. Specifically, an operator pulls a handle on the distributor to drive a control member in the distributor to move and control a plugging member configured to plug a beer outlet in the keg spear to get away from or close to the beer outlet to implement opening and closing. The handle needs to be locked to keep the keg spear in the open state or the closed state. In a conventional art, a first tap position slot and a second tap position slot are disposed in a distributor shell, and an ejector rod capable of getting close to or away from the distributor shell, a movable handle configured to drive the ejector rod to get away from the distributor shell and a spring acting on the ejector rod such that the ejector rod tends to move to the distributor shell are disposed in the handle. The handle may be locked when the ejector rod extends into the first tap position slot or the second tap position slot. When a state of the handle needs to be switched, the operator needs to operate the movable handle to drive the ejector rod to overcome an acting force of the spring to move to a side away from the distributor shell, namely the ejector rod is separated from the first tap position slot or the second tap position slot, and then the operator pulls the handle. After the state of the handle is switched, the movable handle is released, and the ejector rod enters the first tap position slot or the second tap position slot under the action of the spring to implement locking again. This operation process is complicated and inconvenient.

SUMMARY

In order to overcome the shortcomings in the conventional art, the disclosure herein provides an efficient distributor. A first guide surface, a second guide surface and a first reset member are disposed, such that a locking boss and a locking block are automatically unlocked when a state of an operating member is switched and may be automatically locked after the state is switched, and no other operations of a user are needed. Therefore, the efficient distributor is convenient.

In order to achieve the above objective, the disclosure herein is implemented by the following technical solutions.

An efficient distributor used for opening or closing a keg spear includes a distributor shell, an operating member movably mounted to a distributor seat, a locking member configured to lock a state of the operating member, and a control member in drive connection with the operating member to open or close the keg spear.

The operating member includes a locking matching member with a locking boss protruding therefrom. The locking boss includes a first locking matching surface and a second locking matching surface.

The locking member includes a locking block capable of moving to or away from the locking matching member, and a first reset member. The first reset member acts on the locking block such that the locking block tends to move to a side close to the locking matching member. The locking block includes a first locking surface matched with the first locking matching surface and a second locking surface matched with the second locking matching surface.

The operating member drives the control member to open the keg spear when the first locking surface is matched with the first matching surface to lock the operating member. At least one of the first locking surface and the first matching surface is provided with a first guide surface guiding the locking block to move to a side away from the locking matching member.

The operating member drives the control member to close the keg spear when the second locking surface is matched with the second matching surface to lock the operating member. At least one of the second locking surface and the second matching surface is provided with a first guide surface guiding the locking block to move to a side away from the locking matching member.

The keg spear is mounted to a beer outlet of a beer keg. With adoption of the above-mentioned structure, the efficient distributor is mounted to the keg spear. If intended to open the keg spear, a user only needs to operate the operating member such that the locking boss in the locking matching member moves from a state that the second locking matching surface is matched for locking with the second locking surface in the locking block to a state that the first locking matching surface is matched for locking with the first locking surface. In this process, due to the existence of the second guide surface, the locking boss acts on the locking block such that the locking block overcomes an acting force of the first reset member to move to the side away from the locking matching member to release a locked state of the second locking surface and the second locking matching surface and the locking block gives way to the locking boss. When the locking boss moves to the side of the first locking surface in the locking block, the locking block moves to the side close to the locking matching member under the action of the first reset member such that the first locking matching surface is matched for locking with the first locking surface. In the above-mentioned process, the operating member drives the control member to open the keg spear.

If intended to close the keg spear, the user only needs to operate the operating member such that the locking boss in the locking matching member moves from the state that the first locking matching surface is matched for locking with the first locking surface in the locking block to the state that the second locking matching surface is matched for locking with the second locking surface. In this process, due to the existence of the first guide surface, the locking boss acts on the locking block such that the locking block overcomes an acting force of the first reset member to move to the side away from the locking matching member to release a locked state of the first locking surface and the first locking matching surface and the locking block gives way to the locking boss. When the locking boss moves to the side of the second locking surface in the locking block, the locking block moves to the side close to the locking matching member under the action of the first reset member such that the second locking matching surface is matched for locking with the second locking surface. In the above-mentioned process, the operating member drives the control member to close the keg spear.

Since the acting force of the first reset member needs to be overcome to unlock the locking boss and the locking block, it is necessary to apply a certain operating force to the operating member. When there is no external force acting on the operating member or a force applied to the operating member is not strong enough to overcome the acting force of the first reset member, the locking boss and the locking block are kept in the locked state, and thus the control member is kept in a state of opening or closing the keg spear.

In the above-mentioned structure, the user may open or close the keg spear only by operating the operating member forwards or backwards. Due to the existence of the first reset member, the first guide surface and the second guide surface, the locking and unlocking between the locking block and the locking boss are completed automatically in an action process of the locking boss, and no other operations of the user are needed. Therefore, convenience and efficiency in use are ensured.

Further, the first reset member is an elastic member. Specifically, the first reset member is a spring.

Further, at least an end, facing the locking boss, of the first locking surface is inclined to the side of the second locking surface to form the first guide surface. At least an end, facing the locking boss, of the second locking surface is inclined to the side of the first locking surface to form the second guide surface.

At least an end, facing the locking block, of the first locking matching surface is inclined to the side of the second locking matching surface to form the first guide surface. At least an end, facing the locking block, of the second locking matching surface is inclined to the side of the first locking matching surface to form the second guide surface.

Specifically, contact portions of the first locking matching surface and the first locking surface are inclined to form the first guide surfaces, and contact portions of the second locking matching surface and the second locking surface are inclined to form the second guide surfaces.

In a state that the locking boss does not act on the locking block, since the locking block gets close to the locking matching member under the action of the first reset member, the first locking matching surface and the second locking matching surface may wholly contact with the locking block, that is, the whole first locking matching surface is inclined to the side of the second locking matching surface to form the first guide surface, and the whole second locking matching surface is inclined to the side of the first locking matching surface to form the second guide surface.

Further, the locking matching member is rotatably disposed on the distributor seat and protrudes on a side facing the control member to form a driving block. The driving block is located in a non-rotating center of the locking matching member. The control member is slidably mounted in the distributor shell. A driving sliding chute for sliding of the driving block is disposed in the control member. A direction of the driving sliding chute is unparallel to a sliding direction of the control member.

With the adoption of the above-mentioned structure, the driving block slides in the driving sliding chute when the locking matching member rotates. The driving block moves circumferentially with the rotation of the locking matching member, and thus may apply an acting force to a side wall of the driving sliding chute to slide the control member to open or close the keg spear.

Generally, the keg spear is provided with a beer outlet passage and the beer outlet is formed in the keg spear. A bore diameter of the beer outlet is smaller than the beer outlet passage. A plugging member configured to plug the beer outlet and a third reset member acting on the plugging member such that the plugging member moves to a side of plugging the beer outlet are movably disposed in the beer outlet passage. A sliding direction of the control member is a direction of getting close to or away from the plugging member. When moving to a side close to the plugging member, the control member drives the plugging member to overcome an acting force of the third reset member to move to a side away from the beer outlet to open the beer outlet. When the control member moves to a side away from the plugging member, the plugging member moves to a side close to the beer outlet under the action of the third reset member to plug the beer outlet.

Further, the control member is provided with a liquid inlet in fluid communication with the keg spear, a liquid outlet configured to discharge beer, and a fluid passage configured to communicate the liquid inlet with the liquid outlet.

Specifically, the liquid inlet is disposed in a side wall of an end, acting on the keg spear, of the control member. With the adoption of the above-mentioned structure, the control member acts on the plugging member in the keg spear to open the beer outlet and cause beer to enter the beer outlet passage of the keg spear. Since the liquid inlet is disposed, the fluid passage of the control member is communicated with the beer outlet passage of the keg spear, and the beer finally flows out of the liquid outlet of the control member. A liquid outlet pipe matched with the liquid outlet is disposed at the liquid outlet.

Further, the operating member includes an operating handle connected to the locking matching member to drive the locking matching member to act.

With the adoption of the above-mentioned structure, the operating handle is disposed, which makes it convenient for the user to operate the locking matching member.

A handle mounting protruding block protrudes from a junction of the operating handle and the locking matching member. Correspondingly, the junction of the locking matching member and the operating handle is sunken to form a handle mounting groove matched with the handle mounting protruding block. The handle mounting groove and the handle mounting protruding block are provided with anti-rotation structures. Specifically, the handle mounting protruding block adopts a rhombic protruding block, and correspondingly, the handle mounting groove is a matched rhombic groove.

Further, the operating member includes two locking matching members symmetrically disposed on two sides of the control member to drive the control member. Correspondingly, two locking members are symmetrically disposed on the two sides of the control member respectively. The operating handle includes a first connecting portion and a second connecting portion which are connected to the locking matching members on the two sides, as well as a synchronization portion configured to connect and maintain synchronization of the first connecting portion and the second connecting portion.

With the adoption of the above-mentioned structure, the locking matching members and the operating handle of which the first connecting portion and the second connecting portion act synchronously are symmetrically disposed on the two sides of the control member, such that the operating member may drive the control member to act more stably. Specifically, the first connecting portion is in rigid connection with the synchronization portion, and the second connecting portion is in rigid connection with the synchronization portion, so that the first connecting portion and the second connecting portion act synchronously. More specifically, the first connecting portion, the second connecting portion and the synchronization portion are formed integrally.

Further, the efficient distributor includes a fixing assembly fixed with the keg spear. A fixed boss protrudes from a side wall of the keg spear. A fixing portion matched with the side wall of the keg spear protrudes from a mounting side, matched with the keg spear, of the distributor shell. The fixing assembly includes a fastener disposed on the fixing portion. The fastener includes a fastening portion matched with the fixed boss and capable of getting close to or away from the fixed boss.

With the adoption of the above-mentioned structure, the efficient distributor needs to be mounted on the keg spear when being used. The fixing portion of the efficient distributor is mounted along the side wall of the keg spear. When the fixed boss on the side wall of the keg spear contacts with the fastening portion, the fastening portion moves to a side away from the fixed boss at first such that the fixed boss may pass through the fastening portion. Then, the fastening portion moves to a side close to the fixed boss to fix the fixed boss between the fastening portion and the distributor shell, to implement the fixed mounting between the efficient distributor and the keg spear.

Further, the fixing assembly includes a second reset member and a control button. The second reset member acts on the fastener such that the fastening portion tends to move to a side close to the fixed boss. The control button is configured to drive the fastening portion to move to a side away from the fixed boss. A third guide surface configured to guide the fastener to move to the side away from the fixed boss is disposed on the fastener.

With the adoption of the above-mentioned structure, when the fixed boss acts on the fastener, due to the existence of the third guide surface, the fastener overcomes an acting force of the second reset member such that the fastening portion moves to the side away from the fixed boss. When the fixed boss passes through the fastener, the fastening portion moves to a side close to the fixed boss under the action of the second reset member to implement fixation. When intended to separate the efficient distributor from the keg spear, the user only needs to operate the control button such that the control button drives the fastening portion to move to the side away from the fixed boss to unlock the fixed boss and the fastener.

Specifically, the fastener is rotatably mounted to the fixing portion. The fastener further includes a button acting portion and a rotating portion located between the fastener and the button acting portion. The fastener is mounted to the fixing portion by rotation of the rotating portion. The second reset member acts on the fastening portion such that the fastening portion rotates to the side close to the fixed boss. The control button acts on the button acting portion such that the fastening portion rotates to the side away from the fixed boss.

Further, the distributor shell includes a distributor base and a distributor housing matched with the distributor base and forming a mounting accommodation cavity. A mounting hole configured to expose one end of the control member is provided in a mounting surface, matched with the keg spear, of the distributor base. An edge of the mounting hole protrudes to the side of the mounting accommodation cavity to form a mounting tube of the control member configured to movably mount the control member. A locking matching mounting portion configured to movably mount the locking matching member and a locking mounting groove configured to movably mount the locking block protrude from the distributor base to the side of the mounting accommodation cavity.

The control button, the second reset member and the fastener are mounted in the mounting accommodation cavity. The distributor base is provided with a first exposing hole configured to expose the fastener. The distributor housing is provided with a second exposing hole configured to expose the control button.

With the adoption of the above-mentioned structure, each component in the efficient distributor is hidden, so that the whole efficient distributor is more attractive in appearance.

Further, a sealing member is disposed on a side, facing the keg spear, of the control member.

With the adoption of the above-mentioned structure, when the control member acts on the keg spear, namely acts on the plugging member, to open the beer outlet, the side, facing the keg spear, of the control member contacts with an outer wall surface, where the beer outlet is disposed, of the keg spear. With the dispose of the sealing member, the beer is prevented from flowing out of a gap between the control member and the keg spear when the fluid communication is established between the fluid passage of the control member and the beer outlet passage of the keg spear.

Compared with the conventional art, the disclosure herein has the following beneficial effects.

(1) According to the efficient distributor of the disclosure herein, the first guide surface, the second guide surface and the first reset member are disposed, such that the locking boss and the locking block are automatically unlocked when the state of the operating member is switched and may be automatically locked after the state is switched, and no other operations of the user are needed. Therefore, the efficient distributor is convenient.

(2) According to the efficient distributor of the disclosure herein, the fixing assembly for fixing with the keg spear is provided with the fastener with the second guide surface and the second reset member, so that the fixed boss on the keg spear is automatically locked with the fastening portion in the fastener when the efficient distributor is mounted to the keg spear. The fixing assembly further includes the control button to unlock the fastening portion and the fixed boss. The efficient distributor is convenient to use.

(3) The efficient distributor of the disclosure herein is reasonable in design and attractive in appearance.

Reference numerals in the drawings: 1—distributor shell; 101—fixing portion; 102—distributor base; 1021—mounting hole; 1022—mounting tube; 1023—locking matching mounting portion; 1024—locking mounting groove; 103—distributor housing; 104—mounting accommodation cavity; 2—operating member; 201—locking matching member; 2011—driving block; 202—locking boss; 2021—first locking matching surface; 2022—second locking matching surface; 203—operating handle; 2031—first connecting portion; 2032—second connecting portion; 2033—synchronization portion; 3—locking member; 301—locking block; 3011—first locking surface; 3012—second locking surface; 302—first reset member; 4—control member; 401—driving sliding chute; 402—liquid inlet; 403—liquid outlet; 404—fluid passage; 405—liquid outlet pipe; 5—first guide surface; 6—second guide surface; 7—fixing assembly; 701—fastener; 7011—fastening portion; 7012—third guide surface; 7013—button acting portion; 7014—rotating portion; 702—second reset member; 703—control button; 8—sealing member; 9—keg spear; 901—fixed boss; 902—beer outlet passage; 903—beer outlet; 904—plugging member; and 905—third reset member.

DETAILED DESCRIPTION

Specific implementations of the disclosure herein will further be described in detail below in combination with the drawings and embodiments. The following embodiments are used to illustrate the disclosure herein rather than limit the scope of the disclosure herein.

As shown in FIGS. 1 to 7, an efficient distributor used for opening or closing a keg spear 9 includes a distributor shell 1, an operating member 2 movably mounted to a distributor seat, a locking member 3 configured to lock a state of the operating member 2, and a control member 4 in drive connection with the operating member 2 to open or close the keg spear 9.

The operating member 2 includes a locking matching member 201 with a locking boss 202 protruding therefrom. The locking boss 202 includes a first locking matching surface 2021 and a second locking matching surface 2022.

The locking member 3 includes a locking block 301 capable of moving to or away from the locking matching member 201, and a first reset member 302. The first reset member 302 acts on the locking block 301 such that the locking block 301 tends to move to a side close to the locking matching member 201. The locking block 301 includes a first locking surface 3011 matched with the first locking matching surface 2021 and a second locking surface 3012 matched with the second locking matching surface 2022.

The operating member 2 drives the control member 4 to open the keg spear 9 when the first locking surface 3011 is matched with the first matching surface to lock the operating member 2. At least one of the first locking surface 3011 and the first matching surface is provided with a first guide surface 5 guiding the locking block 301 to move to a side away from the locking matching member 201.

The operating member 2 drives the control member 4 to close the keg spear 9 when the second locking surface 3012 is matched with the second matching surface to lock the operating member 2. At least one of the second locking surface 3012 and the second matching surface is provided with a first guide surface 5 guiding the locking block 301 to move to a side away from the locking matching member 201.

Figure 3:
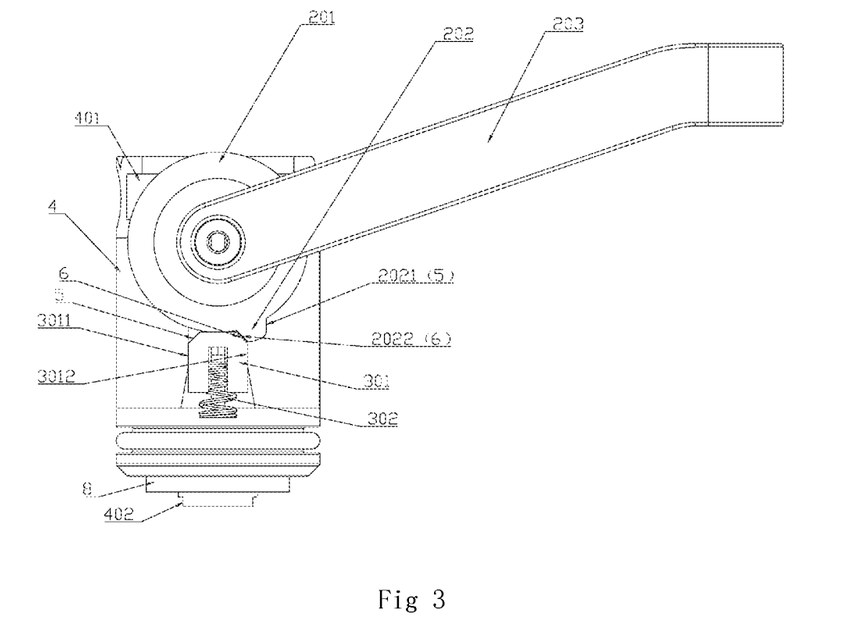
FIG. 3 is a schematic matched structural diagram of a locking boss and locking protruding block of an efficient distributor in a state of closing a keg spear according to the disclosure herein.
Figure 4:
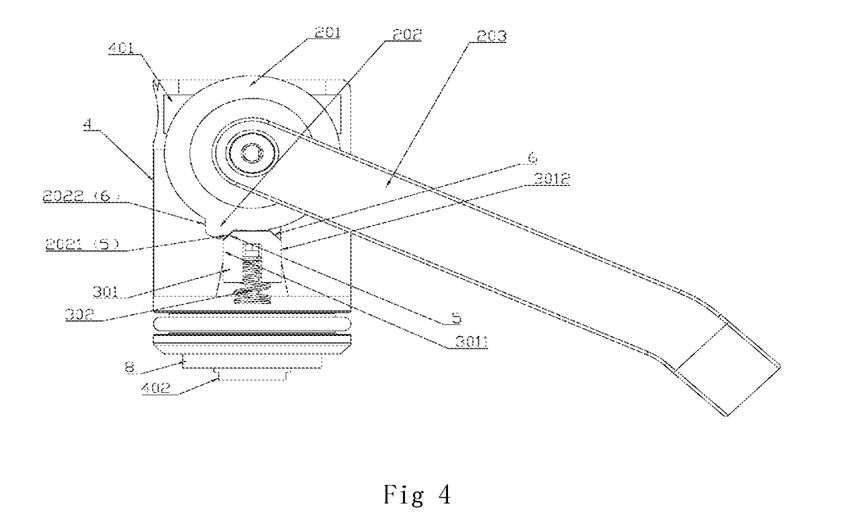
FIG. 4 is a schematic matched structural diagram of a locking boss and locking protruding block of an efficient distributor in a state of opening a keg spear according to the disclosure herein.

As shown in FIGS. 3 and 4, the keg spear 9 is mounted to a beer outlet 903 of a beer keg. With adoption of the above-mentioned structure, the efficient distributor is mounted to the keg spear 9. If intended to open the keg spear 9, a user only needs to operate the operating member 2 such that the locking boss 202 in the locking matching member 201 moves from a state that the second locking matching surface 2022 is matched for locking with the second locking surface 3012 in the locking block 301 to a state that the first locking matching surface 2021 is matched for locking with the first locking surface 3011. In this process, due to the existence of the second guide surface 6, the locking boss 202 acts on the locking block 301 such that the locking block 301 overcomes an acting force of the first reset member 302 to move to the side away from the locking matching member 201 to release a locked state of the second locking surface 3012 and the second locking matching surface 2022 and the locking block 301 gives way to the locking boss 202. When the locking boss 202 moves to the side of the first locking surface 3011 in the locking block 301, the locking block 301 moves to the side close to the locking matching member 201 under the action of the first reset member 302 such that the first locking matching surface 2021 is matched for locking with the first locking surface 3011. In the above-mentioned process, the operating member 2 drives the control member 4 to open the keg spear 9.

If intended to close the keg spear 9, the user only needs to operate the operating member 2 such that the locking boss 202 in the locking matching member 201 moves from the state that the first locking matching surface 2021 is matched for locking with the first locking surface 3011 in the locking block 301 to the state that the second locking matching surface 2022 is matched for locking with the second locking surface 3012. In this process, due to the existence of the first guide surface 5, the locking boss 202 acts on the locking block 301 such that the locking block 301 overcomes an acting force of the first reset member 302 to move to the side away from the locking matching member 201 to release a locked state of the first locking surface 3011 and the first locking matching surface 2021 and the locking block 301 gives way to the locking boss 202. When the locking boss 202 moves to the side of the second locking surface 3012 in the locking block 301, the locking block 301 moves to the side close to the locking matching member 201 under the action of the first reset member 302 such that the second locking matching surface is matched for locking with the second locking surface 3012. In the above-mentioned process, the operating member 2 drives the control member 4 to close the keg spear 9.

Since the acting force of the first reset member 302 needs to be overcome to unlock the locking boss 202 and the locking block 301, it is necessary to apply a certain operating force to the operating member 2. When there is no external force acting on the operating member 2 or a force applied to the operating member 2 is not strong enough to overcome the acting force of the first reset member 302, the locking boss 202 and the locking block 301 are kept in the locked state, and thus the control member 4 is kept in a state of opening or closing the keg spear 9.

In the above-mentioned structure, the user may open or close the keg spear 9 only by operating the operating member 2 forwards or backwards. Due to the existence of the first reset member 302, the first guide surface 5 and the second guide surface 6, the locking and unlocking between the locking block 301 and the locking boss 202 are completed automatically in an action process of the locking boss 202, and no other operations of the user are needed. Therefore, convenience and efficiency in use are ensured.

Preferably, the first reset member 302 is an elastic member. Specifically, the first reset member 302 is a spring.

Preferably, at least an end, facing the locking boss 202, of the first locking surface 3011 is inclined to the side of the second locking surface 3012 to form the first guide surface 5. At least an end, facing the locking boss 202, of the second locking surface 3012 is inclined to the side of the first locking surface 3011 to form the second guide surface 6.

At least an end, facing the locking block 301, of the first locking matching surface 2021 is inclined to the side of the second locking matching surface 2022 to form the first guide surface 5. At least an end, facing the locking block 301, of the second locking matching surface 2022 is inclined to the side of the first locking matching surface 2021 to form the second guide surface 6.

Specifically, contact portions of the first locking matching surface 2021 and the first locking surface 3011 are inclined to form the first guide surfaces 5, and contact portions of the second locking matching surface 2022 and the second locking surface 3012 are inclined to form the second guide surfaces 6.

In a state that the locking boss 202 does not act on the locking block 301, since the locking block 301 gets close to the locking matching member 201 under the action of the first reset member 302, the first locking matching surface 2021 and the second locking matching surface 2022 may wholly contact with the locking block 301. That is, the whole first locking matching surface 2021 is inclined to the side of the second locking matching surface 2022 to form the first guide surface 5, and the whole second locking matching surface 2022 is inclined to the side of the first locking matching surface 2021 to form the second guide surface 6.

Preferably, the locking matching member 201 is rotatably disposed on the distributor seat and protrudes on a side facing the control member 4 to form a driving block 2011. The driving block 2011 is located in a non-rotating center of the locking matching member 201. The control member 4 is slidably mounted in the distributor shell 1. A driving sliding chute 401 for sliding of the driving block 2011 is disposed in the control member 4. A direction of the driving sliding chute 401 is unparallel to a sliding direction of the control member 4.

With the adoption of the above-mentioned structure, the driving block 2011 slides in the driving sliding chute 401 when the locking matching member 201 rotates. The driving block 2011 moves circumferentially with the rotation of the locking matching member 201, and thus may apply an acting force to a side wall of the driving sliding chute 401 to slide the control member 4 to open or close the keg spear 9.

Figure 6:
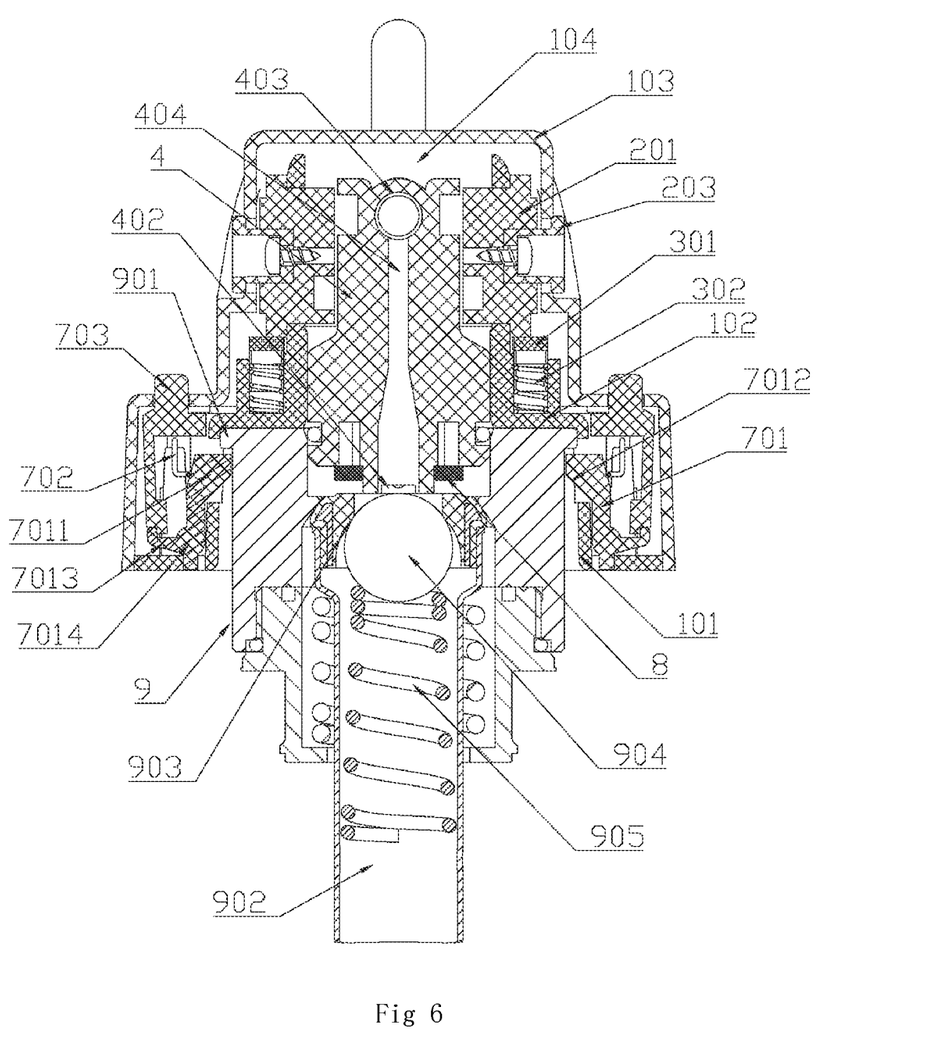
FIG. 6 is a schematic sectional structural diagram of an efficient distributor in a state of closing a keg spear according to the disclosure herein.
Figure 7:
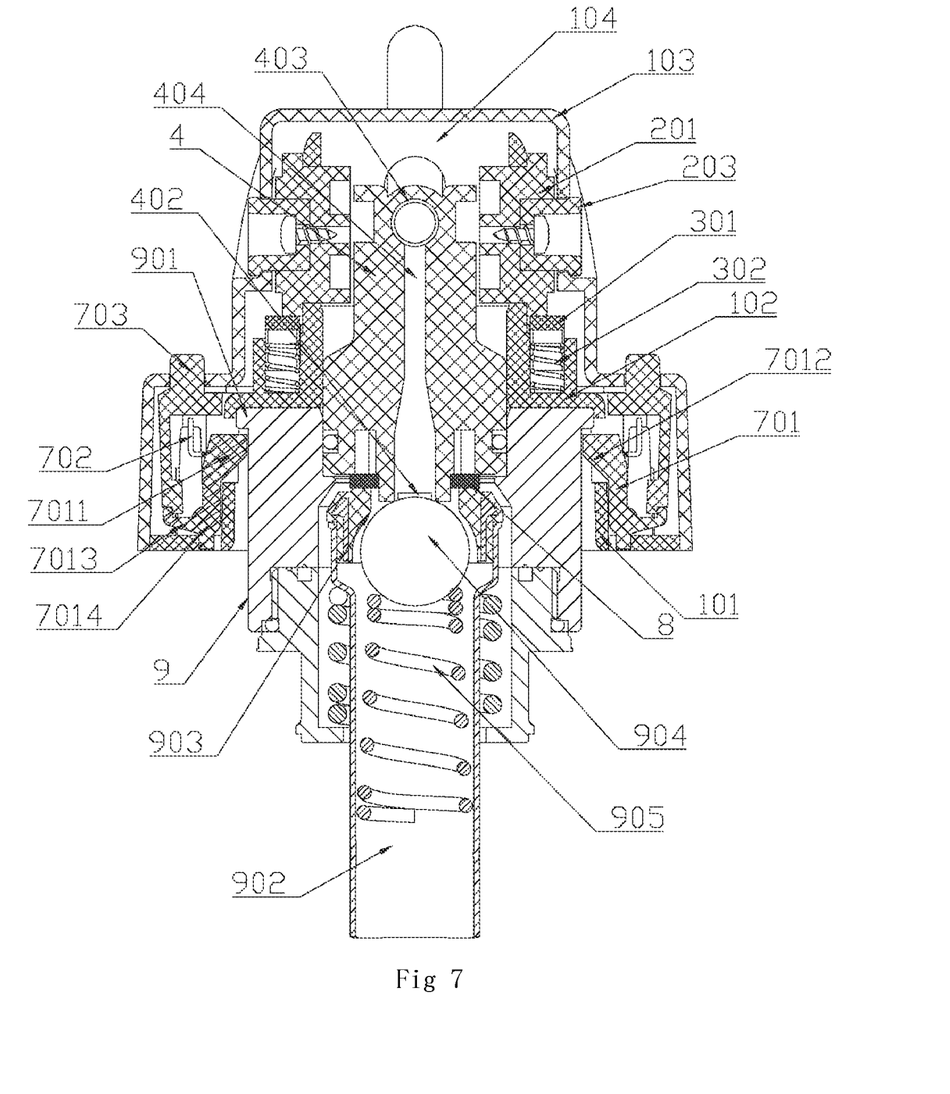
FIG. 7 is a schematic sectional structural diagram of an efficient distributor in a state of opening a keg spear according to the disclosure herein.

As shown in FIGS. 6 to 7, generally, the keg spear 9 is provided with a beer outlet passage 902 and the beer outlet 903 is formed in the keg spear 9. A bore diameter of the beer outlet 903 is smaller than the beer outlet passage 902. A plugging member 904 configured to plug the beer outlet 903 and a third reset member 905 acting on the plugging member 904 such that the plugging member moves to a side of plugging the beer outlet 903 are movably disposed in the beer outlet passage 902. A sliding direction of the control member 4 is a direction of getting close to or away from the plugging member 904. When the control member 4 moves to a side close to the plugging member 904, the control member 4 drives the plugging member 904 to overcome an acting force of the third reset member 905 to move to a side away from the beer outlet 903 to open the beer outlet 903. When the control member 4 moves to a side away from the plugging member 904, the plugging member 904 moves to a side close to the beer outlet 903 under the action of the third reset member 905 to plug the beer outlet 903.

Preferably, the control member 4 is provided with a liquid inlet 402 in fluid communication with the keg spear 9, a liquid outlet 403 configured to discharge beer, and a fluid passage 404 configured to communicate the liquid inlet 402 with the liquid outlet 403.

Specifically, the liquid inlet 402 is disposed in a side wall of an end, acting on the keg spear 9, of the control member 4. With the adoption of the above-mentioned structure, the control member 4 acts on the plugging member 904 in the keg spear 9 to open the beer outlet 903 and cause beer to enter the beer outlet passage 902 of the keg spear 9. With the dispose of the liquid inlet 402, the fluid passage 404 of the control member 4 is communicated with the beer outlet passage 902 of the keg spear 9, and the beer finally flows out of the liquid outlet 403 of the control member 4. A liquid outlet pipe 405 matched with the liquid outlet 403 is disposed at the liquid outlet 403.

Preferably, the operating member 2 includes an operating handle 203 connected to the locking matching member 201 to drive the locking matching member 201 to act.

With the adoption of the above-mentioned structure, the operating handle 203 is disposed, which makes it convenient for the user to operate the locking matching member 201.

A handle mounting protruding block protrudes from a junction of the operating handle 203 and the locking matching member 201. Correspondingly, the junction of the locking matching member 201 and the operating handle 203 is sunken to form a handle mounting groove matched with the handle mounting protruding block. The handle mounting groove and the handle mounting protruding block are provided with anti-rotation structures. Specifically, the handle mounting protruding block adopts a rhombic protruding block, and correspondingly, the handle mounting groove is a matched rhombic groove.

Preferably, the operating member 2 includes two locking matching members 201 symmetrically disposed on two sides of the control member 4 to drive the control member 4. Correspondingly, two locking members 3 are symmetrically disposed on the two sides of the control member 4 respectively. The operating handle 203 includes a first connecting portion 2031 and a second connecting portion 2032 which are connected to the locking matching members 201 on the two sides, as well as a synchronization portion 2033 configured to connect and maintain synchronization of the first connecting portion 2031 and the second connecting portion 2032.

With the adoption of the above-mentioned structure, the locking matching members 201 and the operating handle 203 of which the first connecting portion 2031 and the second connecting portion 2032 act synchronously are symmetrically disposed on the two sides of the control member 4, such that the operating member 2 may drive the control member 4 to act more stably. Specifically, the first connecting portion 2031 is in rigid connection with the synchronization portion 2033, and the second connecting portion 2032 is in rigid connection with the synchronization portion 2033, so that the first connecting portion 2031 and the second connecting portion 2032 act synchronously. More specifically, the first connecting portion 2031, the second connecting portion 2032 and the synchronization portion 2033 are formed integrally.

Figure 5:
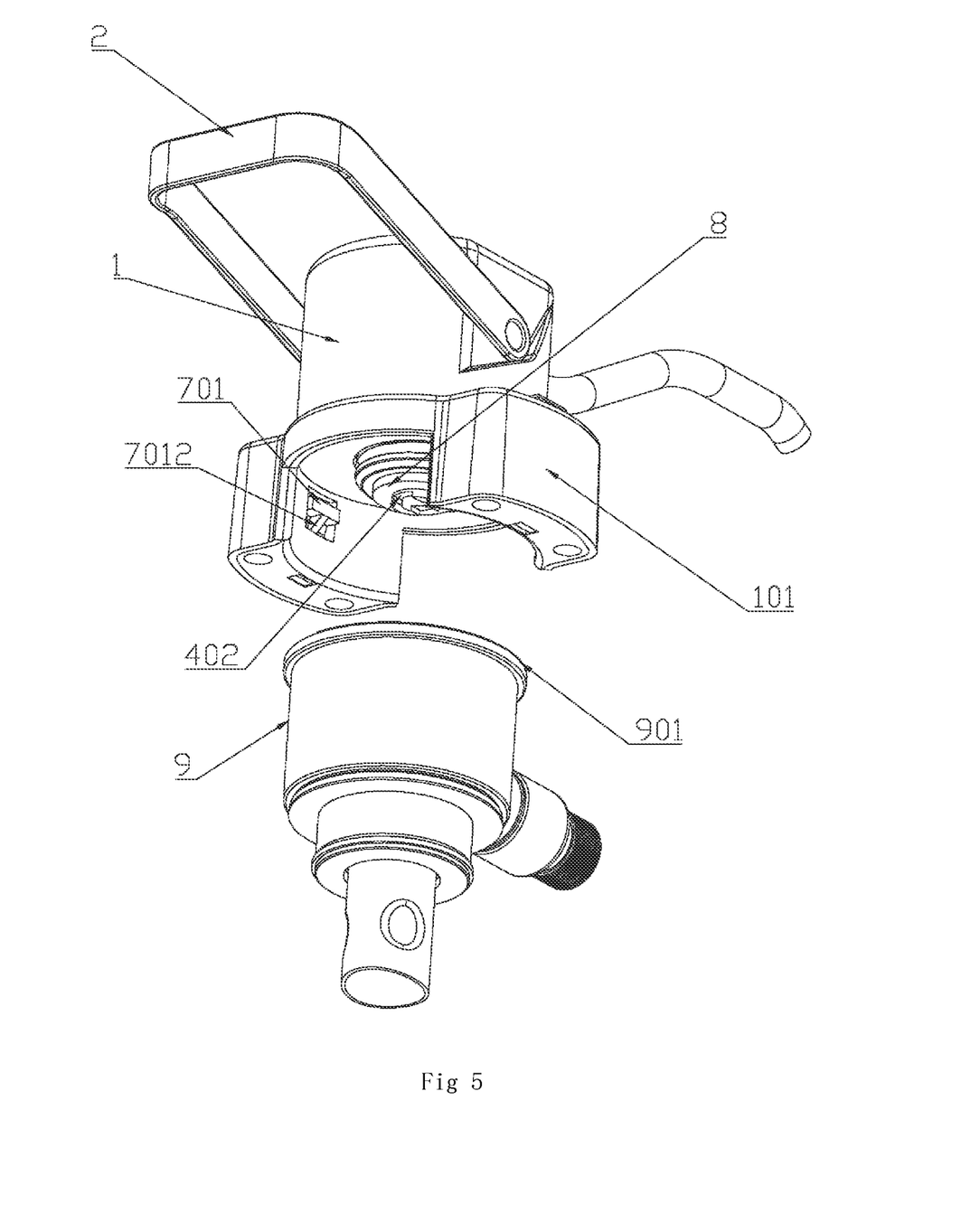
FIG. 5 is a schematic matched structural diagram of an efficient distributor and a keg spear according to the disclosure herein.

As shown in FIGS. 5 to 7, preferably, the efficient distributor includes a fixing assembly 7 fixed with the keg spear 9. A fixed boss 901 protrudes from a side wall of the keg spear 9. A fixing portion 101 matched with the side wall of the keg spear 9 protrudes from a mounting side, matched with the keg spear 9, of the distributor shell 1. The fixing assembly 7 includes a fastener 701 disposed on the fixing portion 101. The fastener 701 includes a fastening portion 7011 matched with the fixed boss 901 and capable of getting close to or away from the fixed boss 901.

With the adoption of the above-mentioned structure, the efficient distributor needs to be mounted on the keg spear 9 when being used. The fixing portion 101 of the efficient distributor is mounted along the side wall of the keg spear 9. When the fixed boss 901 on the side wall of the keg spear 9 contacts with the fastening portion 7011, the fastening portion 7011 moves to a side away from the fixed boss 901 at first such that the fixed boss 901 may pass through the fastening portion 7011. Then, the fastening portion 7011 moves to a side close to the fixed boss 901 to fix the fixed boss 901 between the fastening portion 7011 and the distributor shell 1, to implement the fixed mounting between the efficient distributor and the keg spear 9.

Preferably, the fixing assembly 7 includes a second reset member 702 and a control button 703. The second reset member 702 acts on the fastener 701 such that the fastening portion 7011 tends to move to a side close to the fixed boss 901. The control button 703 is configured to drive the fastening portion 7011 to move to a side away from the fixed boss 901. A third guide surface 7012 configured to guide the fastener 701 to move to the side away from the fixed boss 901 is disposed on the fastener 701.

With the adoption of the above-mentioned structure, when the fixed boss 901 acts on the fastener 701, due to the existence of the third guide surface 7012, the fastener 701 overcomes an acting force of the second reset member 702 such that the fastening portion 7011 moves to the side away from the fixed boss 901. When the fixed boss 901 passes through the fastener 701, the fastening portion 7011 moves to a side close to the fixed boss 901 under the action of the second reset member 702 to implement fixation. When intended to separate the efficient distributor from the keg spear 9, the user only needs to operate the control button 703 such that the control button 703 drives the fastening portion 7011 to move to the side away from the fixed boss 901 to unlock the fixed boss 901 and the fastener 701.

Specifically, the fastener 701 is rotatably mounted to the fixing portion 101. The fastener 701 further includes a button acting portion 7013 and a rotating portion 7014 located between the fastener 701 and the button acting portion 7013. The fastener 701 is mounted to the fixing portion 101 by rotation of the rotating portion 7014. The second reset member 702 acts on the fastening portion 7011 such that the fastening portion 7011 rotates to the side close to the fixed boss 901. The control button 703 acts on the button acting portion 7013 such that the fastening portion 7011 rotates to the side away from the fixed boss 901.

Figure 1:
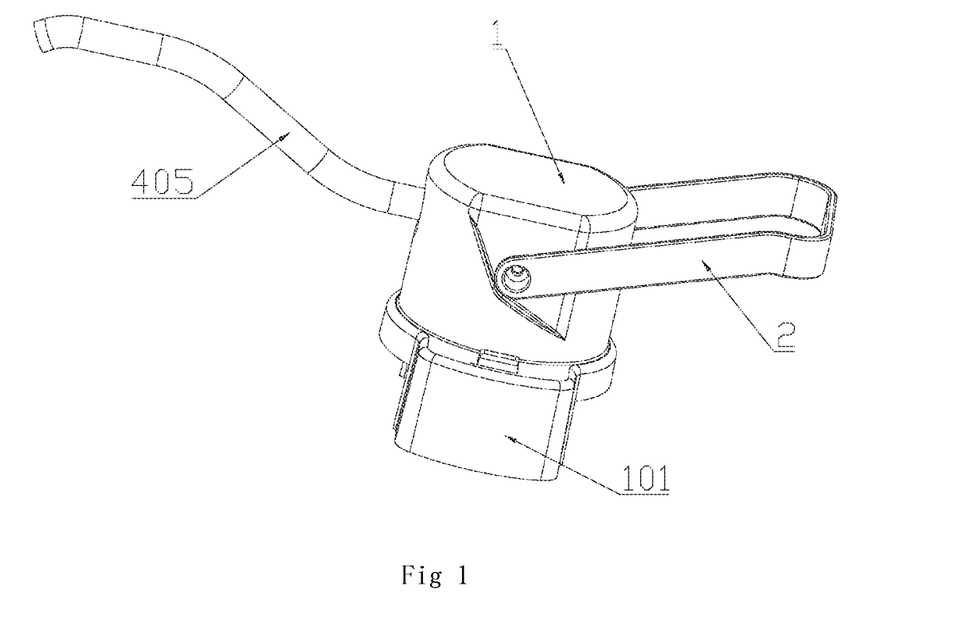
FIG. 1 is a schematic three-dimensional structural diagram of an efficient distributor according to the disclosure herein.
Figure 2:
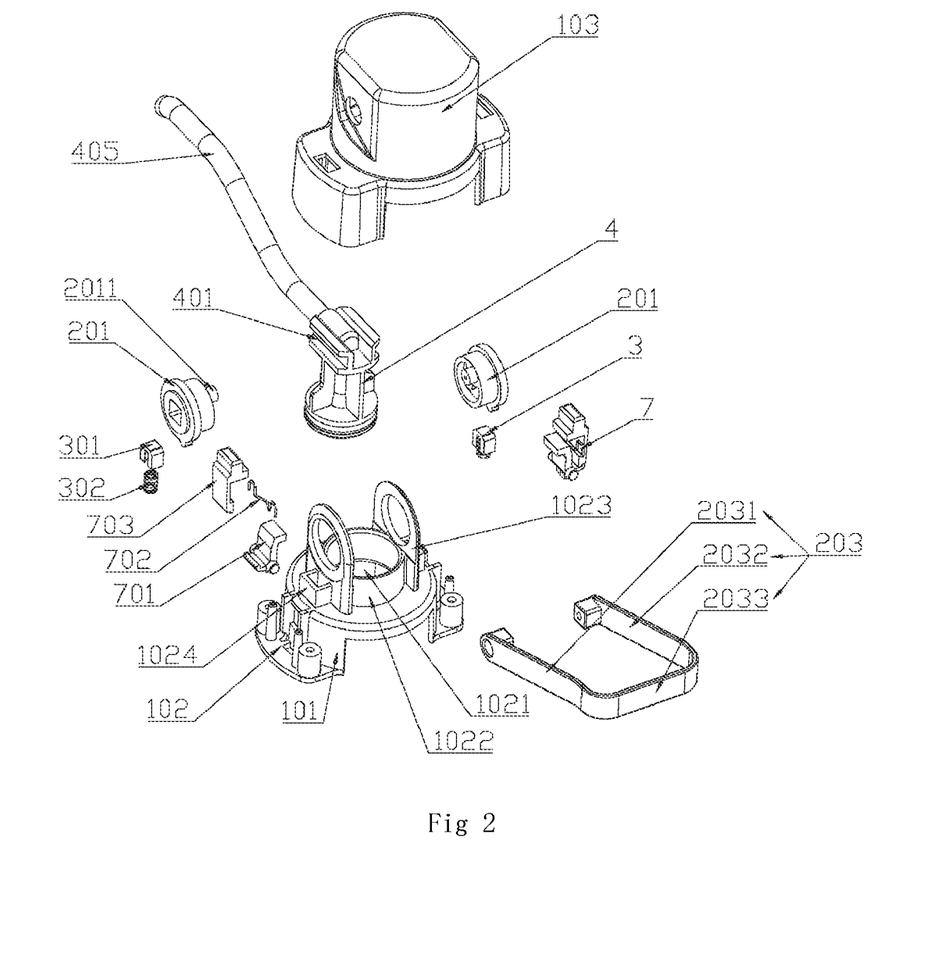
FIG. 2 is a schematic exploded structural diagram of an efficient distributor according to the disclosure herein.

Preferably, the distributor shell 1 includes a distributor base 102 and a distributor housing 103 matched with the distributor base 102 and forming a mounting accommodation cavity 104. A mounting hole 1021 configured to expose one end of the control member 4 is provided in a mounting surface, matched with the keg spear 9, of the distributor base 102. An edge of the mounting hole 1021 protrudes to the side of the mounting accommodation cavity 104 to form a mounting tube 1022 of the control member 4 configured to movably mount the control member 4. A locking matching mounting portion 1023 configured to movably mount the locking matching member 201 and a locking mounting groove 1024 configured to movably mount the locking block 301 protrude from the distributor base 102 to the side of the mounting accommodation cavity 104.

The control button 703, the second reset member 702 and the fastener 701 are mounted in the mounting accommodation cavity 104. The distributor base 102 is provided with a first exposing hole configured to expose the fastener 701. The distributor housing 103 is provided with a second exposing hole configured to expose the control button 703.

With the adoption of the above-mentioned structure, each component in the efficient distributor is hidden, so that the whole efficient distributor is more attractive in appearance.

Preferably, a sealing member 8 is disposed on a side, facing the keg spear 9, of the control member 4.

With the adoption of the above-mentioned structure, when the control member 4 acts on the keg spear 9, namely acts on the plugging member 904, to open the beer outlet 903, the side, facing the keg spear 9, of the control member 4 contacts with an outer wall surface, where the beer outlet 903 is disposed, of the keg spear 9. With the dispose of the sealing member 8, the beer is prevented from flowing out of a gap between the control member 4 and the keg spear 9 when the fluid communication is established between the fluid passage 404 of the control member 4 and the beer outlet passage 902 of the keg spear 9.

The above are only the preferred implementations of the disclosure herein. It is to be pointed out that those of ordinary skill in the art may further make a plurality of improvements and embellishments without departing from the technical principle of the disclosure herein, and these improvements and embellishments shall also fall within the scope of protection of the disclosure herein.

What is claimed is:

1. An efficient distributor, used for opening or closing a keg spear (9) and comprising a distributor shell (1), an operating member (2) movably mounted to a distributor seat, a locking member (3) configured to lock a state of the operating member (2), and a control member (4) in drive connection with the operating member (2) to open or close the keg spear (9), wherein the operating member (2) comprises a locking matching member (201) with a locking boss (202) protruding therefrom, and the locking boss (202) comprises a first locking matching surface (2021) and a second locking matching surface (2022);

the locking member (3) comprises a locking block (301) capable of moving to or away from the locking matching member (201), and a first reset member (302); the first reset member (302) acts on the locking block (301) such that the locking block (301) tends to move to a side close to the locking matching member (201), the locking block (301) comprises a first locking surface (3011) matched with the first locking matching surface (2021) and a second locking surface (3012) matched with the second locking matching surface (2022);

the operating member (2) drives the control member (4) to open the keg spear (9) when the first locking surface (3011) is matched with the first matching surface to lock the operating member (2), and at least one of the first locking surface (3011) and the first matching surface is provided with a first guide surface (5) guiding the locking block (301) to move to a side away from the locking matching member (201); and the operating member (2) drives the control member (4) to close the keg spear (9) when the second locking surface (3012) is matched with the second matching surface to lock the operating member (2), and at least one of the second locking surface (3012) and the second matching surface is provided with a first guide surface (5) guiding the locking block (301) to move to a side away from the locking matching member (201); and at least an end, facing the locking block (301), of the first locking matching surface (2021) is inclined to the side of the second locking matching surface (2022) to form the first guide surface (5).

2. The efficient distributor according to claim 1, wherein at least an end, facing the locking boss (202), of the first locking surface (3011) is inclined to the side of the second locking surface (3012) to form the first guide surface (5); at least an end, facing the locking boss (202), of the second locking surface (3012) is inclined to the side of the first locking surface (3011) to form a second guide surface (6); and at least an end, facing the locking block (301), of the second locking matching surface (2022) is inclined to the side of the first locking matching surface (2021) to form the second guide surface (6).

3. The efficient distributor according to claim 1, wherein the locking matching member (201) is rotatably disposed on the distributor seat and protrudes on a side facing the control member (4) to form a driving block (2011), the driving block (2011) is located in a non-rotating center of the locking matching member (201), the control member (4) is slidably mounted in the distributor shell (1), a driving sliding chute (401) for sliding of the driving block (2011) is disposed in the control member (4), and a direction of the driving sliding chute (401) is unparallel to a sliding direction of the control member (4).

4. The efficient distributor according to claim 1, wherein the control member (4) is provided with a liquid inlet (402) in fluid communication with the keg spear (9), a liquid outlet (403) configured to discharge beer, and a fluid passage (404) configured to communicate the liquid inlet (402) with the liquid outlet (403).

5. The efficient distributor according to claim 1, wherein the operating member (2) comprises an operating handle (203) connected to the locking matching member (201) to drive the locking matching member (201) to act.

6. The efficient distributor according to claim 5, wherein the operating member (2) comprises two locking matching members (201) symmetrically disposed on two sides of the control member (4) to drive the control member (4), and correspondingly, two locking members (3) are symmetrically disposed on the two sides of the control member (4) respectively; and the operating handle (203) comprises a first connecting portion (2031) and a second connecting portion (2032) which are connected to the locking matching members (201) on the two sides, as well as a synchronization portion (2033) configured to connect and maintain synchronization of the first connecting portion (2031) and the second connecting portion (2032).

7. The efficient distributor according to claim 1, comprising a fixing assembly (7) fixed with the keg spear (9), wherein a fixed boss (901) protrudes from a side wall of the keg spear (9), and a fixing portion (101) matched with the side wall of the keg spear (9) protrudes from a mounting side, matched with the keg spear (9), of the distributor shell (1); and the fixing assembly (7) comprises a fastener (701) disposed on the fixing portion (101), and the fastener (701) comprises a fastening portion (7011) matched with the fixed boss (901) and capable of getting close to or away from the fixed boss (901).

8. The efficient distributor according to claim 7, wherein the fixing assembly (7) comprises a second reset member (702) and a control button (703), and the second reset member (702) acts on the fastener (701) such that the fastening portion (7011) tends to move to a side close to the fixed boss (901); the control button (703) is configured to drive the fastening portion (7011) to move to a side away from the fixed boss (901); and a third guide surface (7012) configured to guide the fastener (701) to move to the side away from the fixed boss (901) is disposed on the fastener (701).

9. The efficient distributor according to claim 1, wherein the distributor shell (1) comprises a distributor base (102) and a distributor housing (103) matched with the distributor base (102) and forming a mounting accommodation cavity (104), a mounting hole (1021) configured to expose one end of the control member (4) is provided in a mounting surface, matched with the keg spear (9), of the distributor base (102), an edge of the mounting hole (1021) protrudes to the side of the mounting accommodation cavity (104) to form a mounting tube (1022) of the control member (4) configured to movably mount the control member (4), and a locking matching mounting portion (1023) configured to movably mount the locking matching member (201) and a locking mounting groove (1024) configured to movably mount the locking block (301) protrude from the distributor base (102) to the side of the mounting accommodation cavity (104).

10. The efficient distributor according to claim 1, wherein a sealing member (8) is disposed on a side, facing the keg spear (9), of the control member (4).

* * * * *